United States Patent
Mizutani et al.

(10) Patent No.: US 10,719,283 B2
(45) Date of Patent: Jul. 21, 2020

(54) COMPUTER-READABLE STORAGE MEDIUM AND PRINTING SYSTEM

(71) Applicant: Brother Kogyo Kabushiki Kaisha, Nagoya-shi, Aichi-ken (JP)

(72) Inventors: Aiko Mizutani, Nagoya (JP); Naoki Kusumoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/708,477

(22) Filed: Dec. 10, 2019

(65) Prior Publication Data
US 2020/0110565 A1 Apr. 9, 2020

Related U.S. Application Data

(63) Continuation of application No. 16/143,733, filed on Sep. 27, 2018, now Pat. No. 10,514,872.

(30) Foreign Application Priority Data

Sep. 29, 2017 (JP) .................. 2017-190227

(51) Int. Cl.
*G06F 3/12* (2006.01)
*H04N 1/00* (2006.01)

(52) U.S. Cl.
CPC .......... *G06F 3/1258* (2013.01); *G06F 3/1204* (2013.01); *G06F 3/1205* (2013.01); *H04N 1/00352* (2013.01)

(58) Field of Classification Search
None
See application file for complete search history.

(56) References Cited

U.S. PATENT DOCUMENTS

| 6,798,530 B1 | 9/2004 | Buckley et al. |
| 2003/0079063 A1 | 4/2003 | Iida et al. |
| 2006/0279783 A1 | 12/2006 | Kato |

FOREIGN PATENT DOCUMENTS

JP 2003-131832 A 5/2003

*Primary Examiner* — Lennin R Rodriguezgonzalez
(74) *Attorney, Agent, or Firm* — Banner & Witcoff, Ltd.

(57) ABSTRACT

A non-transitory computer readable storage medium storing computer readable instructions that are executable by a computer in an information processing apparatus is provided. The information processing apparatus has a display interface, an operation interface, and a communication interface, and is connected with a printer through the communication interface. The computer readable instructions, when executed by the computer, causing the computer to control the display interface to display a setting screen to accept entry of print settings applicable to the printer, including a first special setting which is feasible to a first channel but infeasible to a second channel, and in response to a specific operation related to the first special setting to the setting screen through the operation interface, determine the first channel to be a processing channel to be used to cause the printer to print the image.

15 Claims, 12 Drawing Sheets

FIG. 5

611 Number of Copies
[ 1 ]

612 Numbering
Count [ 1 ]

613 Cutting Option
☑ Auto-cut
○ Half-cut
○ Chain-printing
○ Special tape

[ABC|ABC]

614 Print Quality
◉ Priority on speed, 300 by 300 dpi
○ Priority on quality, 300 by 300 dpi
○ High resolution, 300 by 600 dpi

615 Print Start
◉ Start printing as soon as the printer starts receiving data.
○ Start printing when the printer receives data for one page.

616 Halftone
○ Optimized for logo/text
○ Optimized for text/graphic
◉ Optimized for general label including image

[◉ ABC]

617 Brightness ▽
Contrast ▽

618 ○ Bidirectional Communication
619 ○ Horizontal Flip

[ Cancel ] [ Print Start ]
   62          63

611 — Number of Copies: 1

612 — Numbering: Count 1

613 — Cutting Option
- ○ Auto-cut
- ☑ Half-cut
- ○ Chain-printing
- ○ Special tape 614 — Print Quality
- ◉ Priority on speed, 300 by 300 dpi
- ○ Priority on quality, 300 by 300 dpi
- ○ High resolution, 300 by 600 dpi 615 — Print Start
- ◉ Start printing as soon as the printer starts receiving data.
- ○ Start printing when the printer receives data for one page.

616 — Halftone
- ○ Optimized for logo/text
- ○ Optimized for text/graphic
- ◉ Optimized for general label including image 617 — Brightness / Contrast 618 — ☑ Bidirectional Communication 619 — ○ Horizontal Flip 62 — Cancel
63 — Print Start

- 611: Number of Copies — 1
- 612: Numbering — Count 1
- 613: Cutting Option
  - ☑ Auto-cut
  - ○ Half-cut
  - ○ Chain-printing
  - ○ Special tape
- 614: Print Quality
  - ◉ Priority on speed, 300 by 300 dpi
  - ○ Priority on quality, 300 by 300 dpi
  - ○ High resolution, 300 by 600 dpi
- 615: Print Start
  - ◉ Start printing as soon as the printer starts receiving data.
  - ○ Start printing when the printer receives data for one page.
- 616: Halftone
  - ○ Optimized for logo/text
  - ○ Optimized for text/graphic
  - ◉ Optimized for general label including image
- 617: Brightness / Contrast
- 618: ○ Bidirectional Communication
- 619: ☑ Horizontal Flip Cancel (62)   Print Start (63)

72

91

614 {
Print Quality
⊙ Priority on speed, 300 by 300 dpi
○ Priority on quality, 300 by 300 dpi
○ High resolution, 300 by 600 dpi 615 {
Print Start
⊙ Start printing as soon as the printer starts receiving data.
○ Start printing when the printer receives data for one page.

616 {
Halftone
○ Optimized for logo/text
○ Optimized for text/graphic
⊙ Optimized for general label including image 617 {
Brightness
Contrast 618 { ☑ Bidirectional Communication 621 {
Cutting Option
☑ Half-cut
○ Special tape

COMPUTER-READABLE STORAGE MEDIUM AND PRINTING SYSTEM

CROSS REFERENCE TO RELATED APPLICATION

This application is a Continuation of U.S. patent application Ser. No. 16/143,733 filed Sep. 27, 2018, which claims priority from Japanese Patent Application No. 2017-190227, filed on Sep. 29, 2017, the entire subject matters of which are incorporated herein by reference.

BACKGROUND

Technical Field

An aspect of the present disclosure is related to a computer-readable storage medium storing a program to be installed in an information processing apparatus, which is capable of communicating with a printer, and a printing system. Specifically, the present disclosure is related to a user interface, through which print settings may be made, for the information processing apparatus.

Related Art

An information processing apparatus capable of communicating with another device, such as a printer, may process data according to various types of settings and may accept the settings for processing the data through a user interface provided by an application program or a printer driver. The information processing apparatus may be connectable with a plurality of printers, and the information processing apparatus may be commanded to switch the printers to print an image from one to another. When, for example, the two printers are drivable by a same printer driver, information concerning print settings saved by the printer driver in the former printer may be transferred to the printer driver in the latter printer.

SUMMARY

In recent years, information processing apparatuses having a so-called driverless printing function, such as AirPrint (registered trademark), which enables image printing in conformity with a predetermined printing standard without using a printer driver, have been introduced. The information processing apparatus may transfer image data for an image to be printed to a printer in conformity with a predetermined printing standard using a basic print controlling function provided by Operating System (OS). The printer receiving the image data may print an image based on the image data according to a program installed in the printer in conformity with a predetermined printing standard.

The basic print controlling function usable as above may provide fewer or less complicated print setting options to a user, and a level of printing quality available from the basic print controlling function may not be satisfactory to the user. In order to overcome the insufficiency, more advanced or detailed print setting options may be achieved through a specialized print controlling function applicable to a specific printer, which may be obtained separately from the OS and applied to the printer. The information processing apparatus equipped with the specialized print controlling function may process the image data for the image to be printed by a program specifically designed for the printer. Meanwhile, the printer may print an image based on the image data processed by the specifically designed program. The information processing apparatus equipped with the different print controlling programs may have a plurality of processing channels to process the image data between the information processing apparatus and the printer, even when the information processing apparatus and the printer are connected with each other through a single communication interface.

While the plurality of processing channels to process the image data may be available to the information processing apparatus, print setting items applicable to image processing may vary depending on the processing channel to be used. Therefore, a plurality of styles of user interfaces, through which the print settings may be made, may be prepared for the plurality of processing channels, and the user interfaces may be switched from one to the other depending on the processing channel to be used for the image processing. Meanwhile, some users may not necessarily require advanced print settings or may not place emphasis on the processing channel to be used. In such a case, the users may be confused if the user interfaces are different depending on the processing channel to be used.

The present disclosure is advantageous in that a printing system, having a printer and an information processing apparatus connected with each other through a plurality of processing channels there-between, in which print settings may be less confusing to a user, is provided.

According to an aspect of the present disclosure, a non-transitory computer readable storage medium storing computer readable instructions that are executable by a computer in an information processing apparatus, having a display interface, an operation interface, and a communication interface through which the information processing apparatus is connected with a printer, is provided. The information processing apparatus has a first channel and a second channel each configured to cause the printer to print an image through the communication interface based on image data. The computer readable instructions, when executed by the computer, causing the computer to control the display interface to display a setting screen, the setting screen being configured to accept entry of print settings applicable to the printer, the print settings including a first special setting, the first special setting being feasible to the first channel but infeasible to the second channel; and in response to a specific operation to the setting screen through the operation interface, the specific operation being an operation related to the first special setting, determine the first channel to be a processing channel to be used to cause the printer to print the image.

According to another aspect of the present disclosure, a printing system having an information processing apparatus and a printer, which are configured to communicate with each other in conformity with a predetermined communication protocol, is provided. The printing system has channels configured to cause the printer to print an image based on image data. The channels include a first channel configured to cause the information processing apparatus to conduct a first rasterization process to generate first rasterized data, and cause the printer to receive the first rasterized data and print an image based on the first rasterized data; and a second channel configured to cause the printer to conduct a second rasterization process to generate second rasterized data and print the image based on the second rasterized data. The information processing apparatus is configured to display a setting screen, the setting screen being configured to accept entry of print settings applicable to the printer, the print settings including a first special setting, the first special setting being feasible to the first channel but infeasible to the second channel; and in response to a specific operation to the setting screen, the specific operation being an operation related to the first special setting, determine the first channel to be a processing channel to be used to cause the printer to print the image.

BRIEF DESCRIPTION OF THE
ACCOMPANYING DRAWINGS

FIG. 5 is an illustrative view of a print setting screen to be displayed in the information processing apparatus according to the first embodiment of the present disclosure.

FIG. 8 is an illustrative view of a first channel setting screen to be displayed in the information processing apparatus according to the first embodiment of the present disclosure.

FIG. 9 is an illustrative view of a second channel setting screen to be displayed in the information processing apparatus according to the first embodiment of the present disclosure.

FIG. 11 is an illustrative view of a first channel setting screen to be displayed in the information processing apparatus according to a second embodiment of the present disclosure.

DETAILED DESCRIPTION

Hereinafter, with reference to the accompanying drawings, described below will be a printing system 100 according to the embodiments of the present disclosure.

Figure 1:
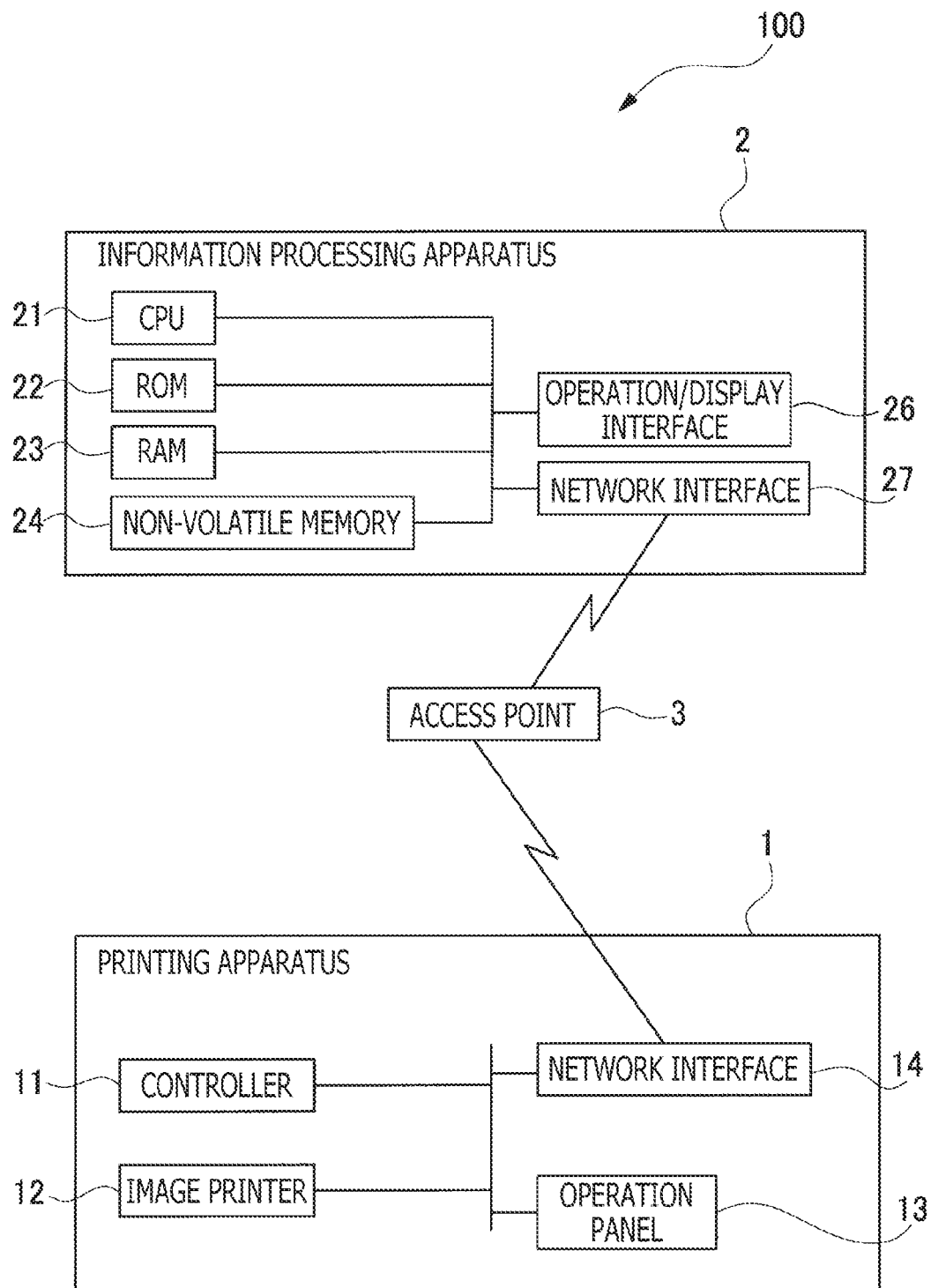
FIG. 1 is a block diagram to illustrate a printing system according to a first embodiment of the present disclosure.

The printing system 100 according to a first embodiment includes, as shown in FIG. 1, a printing apparatus 1 and an information processing apparatus 2 that may communicate with each other. The printing apparatus 1 may print an image on a printable medium and may include, for example, a label printer, a page printer, a copier, and a multifunction peripheral device. The information processing apparatus 2 may generate and edit image data for the image to be printed in the printing apparatus 1, and transmit a print execution command and the image data to the printing apparatus 1. The information processing apparatus 2 may include, for example, a smartphone, a personal computer, and a tablet computer. The printing apparatus 1 and the information processing apparatus 2 in the printing system 100 may not necessarily be limited to a single printing apparatus 1 and a single information processing apparatus 2, respectively, but may include a plurality of printing apparatuses 1 and a plurality of information processing apparatuses 2, respectively.

The printing apparatus 1 includes, as shown in FIG. 1, a controller 11, an image printer 12, an operation panel 13, and a network interface 14. The controller 11 includes a CPU and a memory and may control devices and parts in the printing apparatus 1. The controller 11 drawn as a single piece of hardware controller in FIG. 1 may not necessarily be limited to a single piece of hardware controller but may include a plurality of hardware devices that may collectively control the printing apparatus 1.

The image printer 12 may print an image on a printable medium in an image forming technic, which may be, for example, an electro-photographic technic or an inkjet printing technic. The operation panel 13 may include, for example, a touch panel, which may accept a user's input and display information. The printing apparatus 1 may be capable of printing either colored images or monochrome images. The operation panel 13 may include indicator lamps and buttons. The network interface 14 may include a hardware device to establish communication with the information processing apparatus 2.

The information processing apparatus 2 includes, as shown in FIG. 1, a CPU 21, a ROM 22, a RAM 23, a non-volatile memory 24, an operation/display interface 26, and a network interface 27. The ROM 22 may store programs including an activation program to activate the information processing apparatus 2. The RAM 23 may be used as a work area for processing data and as a temporary memory area to store data temporarily. The non-volatile memory 24 may be, for example, an HDD and a flash memory, and store programs and data therein. The operation/display interface 26 may be a combined unit including an operation interface and a display interface.

The CPU 21 may process information according to programs read from the ROM 22 and the non-volatile memory 24. The operation/display interface 26 may include, for example, a touch panel, which may accept a user's input and display information. The operation/display interface 26 may include, for example, a keyboard, a mouse, and a display. The network interface 27 is a hardware device to establish communication with the printing apparatus 1.

In the printing system 100, the information processing apparatus 2 and the printing apparatus 1 may communicate with each other wirelessly in conformity with Wi-Fi (registered trademark) standard through a common access point 3. In this regard, the network interfaces 14, 27 are interfaces that enable wireless communication in conformity with the Wi-Fi standard, more specifically, with IEEE 802.11 standard or other standards in compliance with IEEE 802.11. However, the technology to establish wireless communication between the information processing apparatus 2 and the printing apparatus 1 may not necessarily be limited to the Wi-Fi standard. For example, the information processing apparatus 2 and the printing apparatus 1 may wirelessly communicate with each other through direct connection without communicating through the access point 3.

Figure 2:
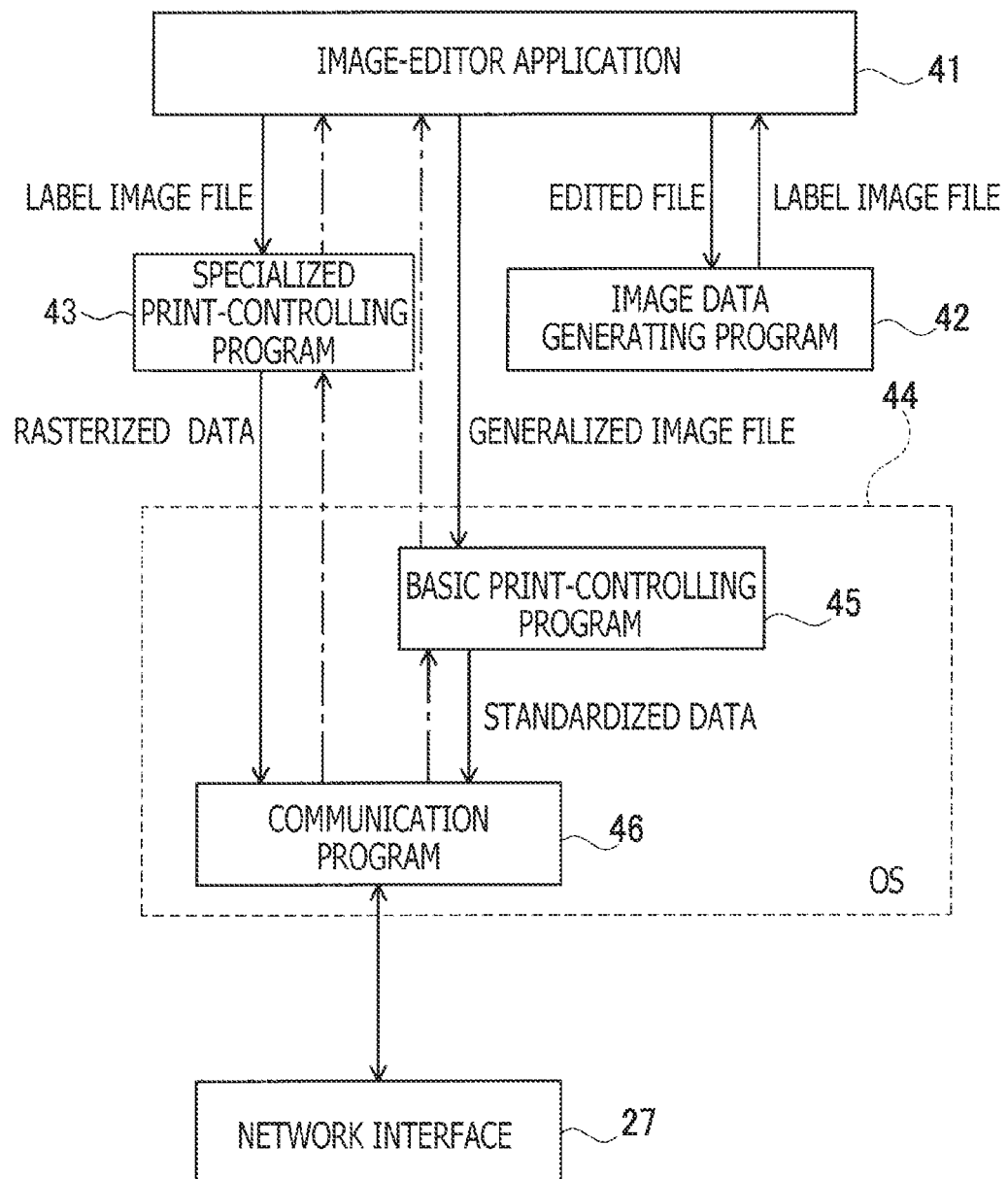
FIG. 2 is a block diagram to illustrate printing programs in an information processing apparatus in the printing system according to the first embodiment of the present disclosure.

The non-volatile memory 24 in the information processing apparatus 2 stores, as shown in FIG. 2, an image-editor application 41 being an application program for editing images, an image data creating program 42, a specialized print-controlling program 43, an operating system (OS) 44. The OS 44 for the information processing apparatus 2 includes a basic print-controlling program 45 and a communication program 46. In the following paragraphs, an application program may be referred to as an application. In FIG. 2, directions of data flows from one program to another program are indicated by solid arrows.

The image-editor application 41 is a program having functions to, for example, accept commands from a user, display an image, and edit and save the image. The image-editor application 41 further has functions to read a generated label image file, accept a print command, and accept setting options for printing an image.

The image-editor application 41 further has a function to obtain status information from the printing apparatus 1 through the specialized print-controlling program 43 or the basic print-controlling program 45, as indicated by dash-and-dot lines in FIG. 2. The status information may include, for example, a print completion report and an error report.

The image data generating program 42 is a program having a function to create an image file for an image to be printed. The image data generating program 42 in the information processing apparatus 2 may, for example, create the label image file according to a command entered through the image-editor application 41. The label image file may be a data file to print an image on a label medium, which may be a strip of tape.

The specialized print-controlling program 43 is a program having functions to, for example, generate rasterized data, by rasterizing image data contained in the label image file, and control the communication program 46 to transmit the generated rasterized data to the printing apparatus 1. The specialized print-controlling program 43 may be designed to specifically control a printing apparatus in a specific model. Therefore, the specialized print-controlling program 43 may not control a printing apparatus in a different model from a different manufacturer. The specialized print-controlling program 43 is a specialized program to control the printing apparatus 1 and may cope with more advanced or detailed print settings, which are applicable to image processing for printing the image in the printing apparatus 1. The specialized print-controlling program 43 may generate rasterized data in a format, which is feasible to the printing apparatus 1.

The basic print-controlling program 45 is a program having functions to generate standardized data for printing in conformity with a predetermined printing standard and control the communication program 46 to transmit the generated standardized data to the printing apparatus 1. The basic print-controlling program 45 is a basic program provided by the OS 44. The standardized data transmitted by the basic print-controlling program 45 may be data in conformity with a general rasterization standard, which is feasible to the printing apparatus 1, and is not rasterized.

The basic print-controlling program 45 is a general program designed to run on a variety of printing apparatuses that support a predetermined printing standard. In other words, as long as the printing apparatus has a functionality to cope with the basic print-controlling program 45, the printing apparatus may print an image by the standardized data regardless of a model or a manufacturer of the printing apparatus. Meanwhile, due to the versatility of the basic print-controlling program 45 to cope with the variety of printing apparatuses, print setting options applicable through the basic print-controlling program 45 may be limited to basic settings. Therefore, the basic print-controlling program 45 may not always accept the print setting options that are feasible to the printing apparatus 1. Printing systems utilizing the basic print-controlling program 45 may include, for example, AirPrint (registered trademark) and Mopria (registered trademark).

The communication program 46 is a program having a function to control the network interface 27 to communicate with another communication device. For example, the specialized print-controlling program 43 may transfer the generated rasterized data to the OS 44. The OS 44 of the information processing apparatus 2 may transmit the rasterized data through the communication program 46 to the printing apparatus 1 via the network interface 27. The communication program 46 is another one of basic programs provided by the OS 44. A part of the communication program 46 may be stored in the ROM 22.

Figure 3:
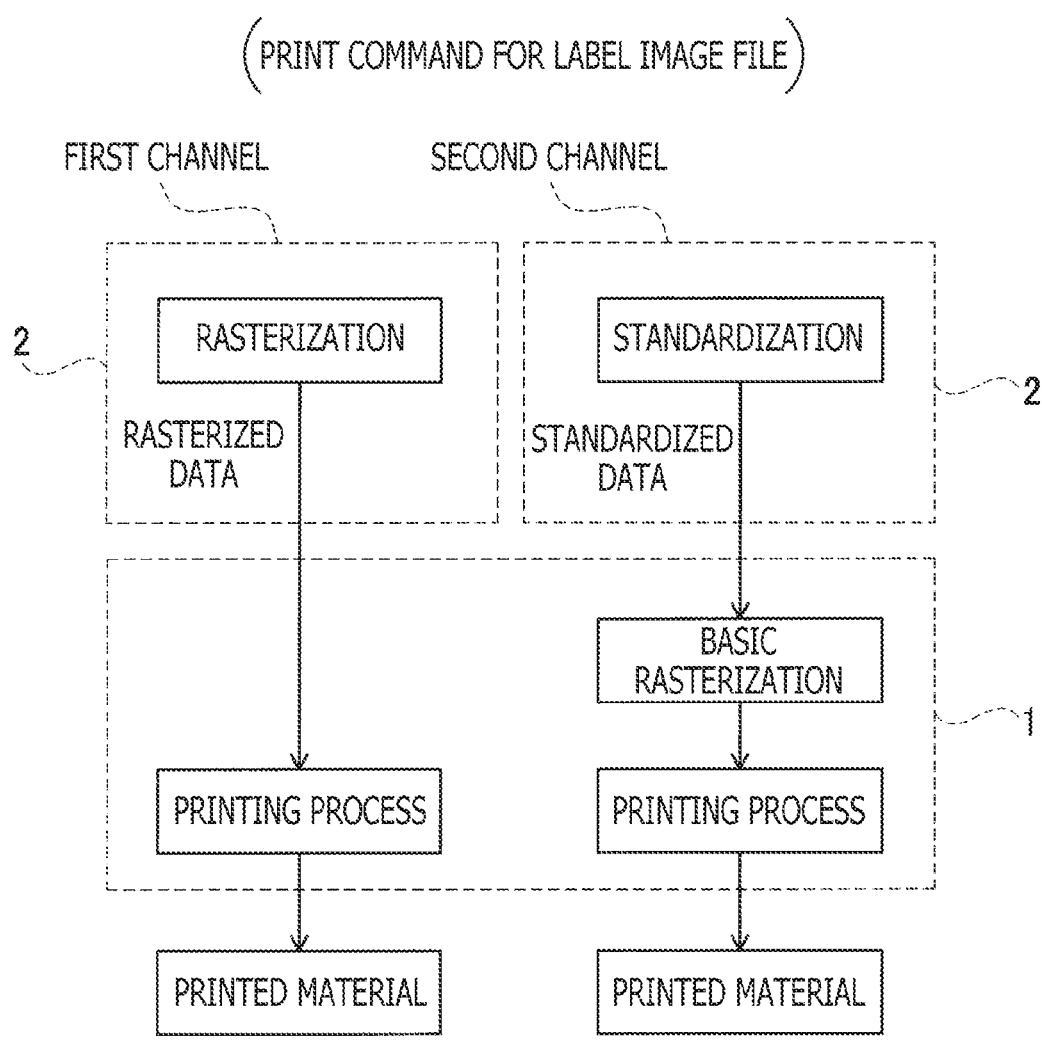
FIG. 3 is a block diagram to illustrate processing channels for the information processing apparatus in the printing system according to the first embodiment of the present disclosure.

The printing system 100 may have, as indicated in FIG. 3, two (2) channels to process data for commanding the printing apparatus 1 to print an image. The channels include a first channel, in which the information processing apparatus 2 may rasterize the image data, and a second channel, in which the printing apparatus 1 may rasterize the image data.

In order to control the printing apparatus 1 to print the image through the first channel, the information processing apparatus 2 may, as shown in FIG. 3, rasterize the image data contained in the label image file in a rasterization process and transmit the rasterized data to the printing apparatus 1. The printing apparatus 1 may receive the rasterized data and print the image based on the rasterized data having been received. Through the first channel, the information processing apparatus 2 rasterizes the image data for the image to be printed by the specialized print-controlling program 43 shown in FIG. 2.

The specialized print-controlling program 43 may be a program designed to process the data specifically through the first channel The specialized print-controlling program 43 is not provided by the OS 44. In order to print the image through the first channel, the information processing apparatus 2 may not use print-controlling functions (e.g., the basic print-controlling program 45) contained in the OS 44 but may use the specialized print-controlling program 43. The first channel, which uses the specialized print-controlling program 43, may be therefore feasible to all of the print settings that are applicable to the printing apparatus 1.

In order to control the printing apparatus 1 to print the image through the second channel, the information processing apparatus 2 may, as shown in FIG. 3, standardize the image data contained in the label image file in a standardization process and transmit the standardized data to the printing apparatus 1. The printing apparatus 1 may receive the standardized data, rasterize the standardized data in a general rasterization process, and print an image based on the rasterized data having been rasterized. Through the second channel, the information processing apparatus 2 standardizes the image data of the image to be printed by the basic print-controlling program 45 shown in FIG. 2.

Through the second channel, the data is processed by the basic print-controlling program 45, which is a print-controlling function included in the OS 44. In this regard, the second channel may not be feasible to all of the functions provided by some printing apparatuses. The basic print-controlling program 45 may only accept common print settings that are feasible to general printing apparatuses as valid print settings. For example, the basic print-controlling program 45 may not be adapted to handle image data in a high resolution, which may only be adaptable to a specific model of printing apparatuses.

The first channel and the second channel differ in the subjects to process the image data of the image to be printed. Namely, through the first channel, it is the information processing apparatus 2 that rasterizes the image data. On the other hand, through the second channel, it is the printing apparatus 1 that rasterizes the image data. In other words, the first channel is a channel, in which the information processing apparatus 2 rasterizes the image data, and the second channel is a channel, in which the printing apparatus 1 rasterizes the image data. Further, the first channel and the second channel may differ in algorisms to rasterize the image data and in outcomes of the rasterization. In other words, in the first channel, more advanced or detailed print settings may be applicable to the rasterization, while in the second channel some of the print settings may be limited in the rasterization. Furthermore, the first channel and the second channel may differ in types and formats of the data to be transmitted from the information processing apparatus 2 to the printing apparatus 1. Therefore, while images may be printed based on a same label image file, an image as a printed outcome through the first channel and an image as a printed outcome through the second channel may not be the same but may appear differently.

While some printing apparatuses may handle both data processed through the first channel and data processed through the second channel, other printing apparatuses may handle solely either the data processed through the first channel or the data processed through the second channel. Meanwhile, the information processing apparatus 2 may determine which channel between the first channel and the second channel is available as a processing channel for a printing apparatus, or whether both the first channel and the second channel are available as a processing channel for the printing apparatus, based on information concerning the printing apparatus, which includes, for example, a model name, a model number, a version number of firmware. The information processing apparatus 2 may transmit the data to the printing apparatus 1 wirelessly through the network interface 27 regardless of the processing channel to be used. In other words, whether the processing channel to be used to process the data to print the image is the first channel or the second channel, the communication method between the information processing apparatus 2 and the printing apparatus 1 may be fixed.

The printing apparatus 1 in the printing system 100 according the present embodiment is feasible both to print an image based on the rasterized data generated through the first channel and the rasterized data generated in the printing apparatus 1, and to rasterize the standardized data received through the second channel and thereafter print the image based on the rasterized data. In other words, the printing system 100 is feasible to process the data to print the image through both the first channel and the second channel.

The image-editor application 41 may, upon entry of a command to start printing an image and before starting a process for printing the image, appoint one of the first channel and the second channel to be the processing channel. The image-editor application 41 may, for example, determine the processing channel based on an operation to the operation/display interface 26 by a user and process data through the determined processing channel to command the printing apparatus 1 to print the image. Flows in a procedure to appoint the processing channel will be described later.

Next, in the following paragraphs, described will be flows of printing actions to be performed in the printing system 100 according to the present embodiment. A user who wishes to use the printing system 100 to print an image based on a label image file may activate the image-editor application 41 in the information processing apparatus 2 and edit image data for the image to be printed.

Figure 4:
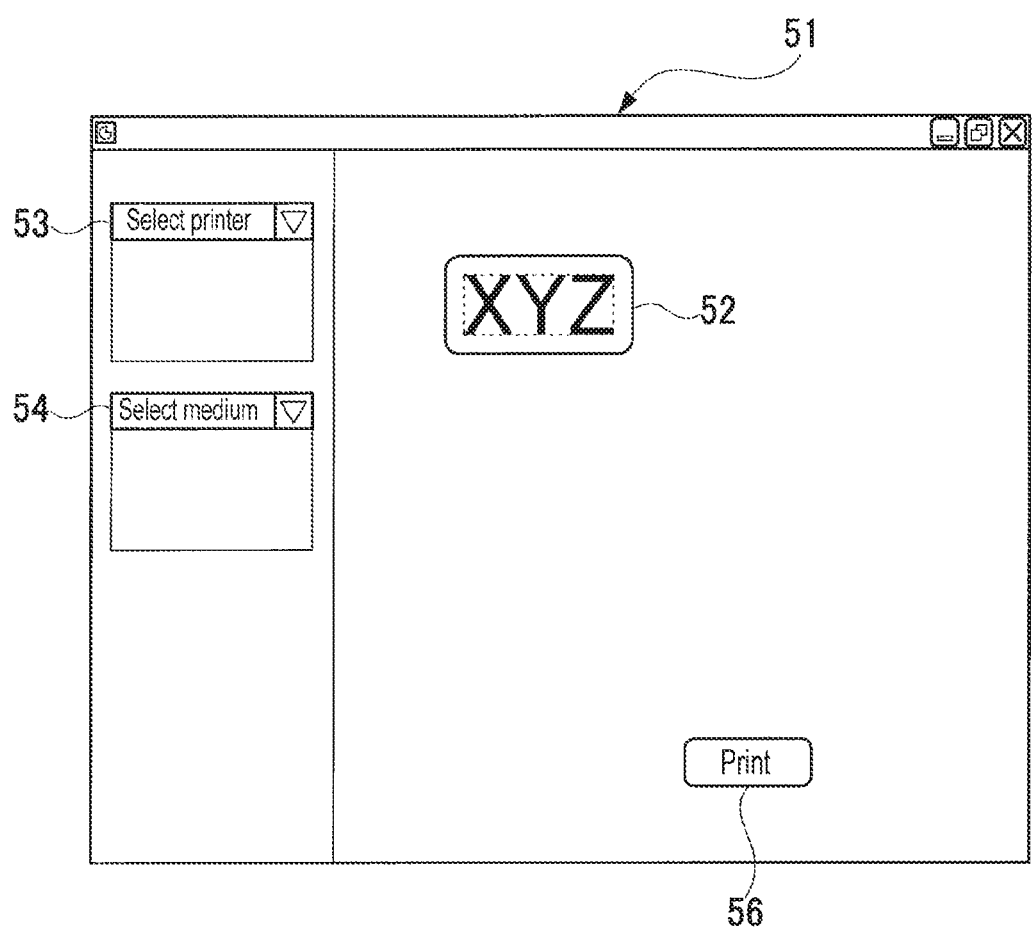
FIG. 4 is an illustrative view of an editor screen to be displayed in the information processing apparatus according to the first embodiment of the present disclosure.

As the image-editor application 41 starts, the information processing apparatus 2 displays an editor screen 51 as shown in, for example, FIG. 4. The editor screen 51 may contain, for example, a print image 52, a printer selecting field 53, a medium selecting field 54, and a print button 56. The print image 52 expresses an image of a printed outcome. The printer selecting field 53 may accept a user's selection for a printing apparatus, including the printing apparatus 1, to print the image. The medium selecting field 54 may accept a user's selection for a printing medium. The print button 56 may accept entry of a print commanding operation from the user to command the information processing apparatus 2 to prepare for image printing.

The image-editor application 41 displays, upon entry of the print command by the operation to the print button 56, a print setting screen 61 as shown in FIG. 5. The print setting screen 61 is a single screen to display entire print setting options, which are feasible to at least one of the first channel and the second channel In particular, the print setting screen 61 may, as shown in FIG. 5, display applicable options for print setting items, which include a number of copies 611, numbering 612, cutting option 613, print quality 614, print start 615, halftone 616, brightness/contrast 617, bidirectional communication 618, and horizontal flip 619. The print setting screen 61 may further contain a cancel button 62 and a print start button 63.

The cancel button 62 may be operated in order to cancel operations to the print setting screen 61 and return to the editor screen 51 (see FIG. 4). The print start button 63 may be operated in order to validate the print setting options selected through the print setting screen 61 and command the information processing apparatus 2 and the printing apparatus 1 to start printing the image. In response to the operation to the print start button 63 by the user, the information processing apparatus 2 may process the image data for the image to be printed through one of the first channel and the second channel, which is appointed as the processing channel at the moment, and output data to command the printing apparatus 1 to print the image to the printing apparatus 1.

From the options for the print setting items applicable through the print setting screen 61 as shown in FIG. 5 and between the first channel and the second channel in the printing system 100, three patterns of combinations for the print setting items, applicable options, and feasible processing channels may be available: (1) Print settings that are feasible solely to the first channel, (2) Print setting that is feasible solely to the second channel, and (3) Print settings that are feasible to both the first channel and the second channel. The pattern (1), i.e., the print settings that are feasible solely to the first channel, may include the options "half-cut" and "special tape" for the print setting item "cutting option" 613, the options other than a default setting for the print setting item "print quality" 614, the option other than a default setting for the print setting item "print start" 615, the options other than a default setting for the print setting item "halftone" 616, adjustments for the print setting items "brightness/contrast" 617, and setting for the print setting item "bidirectional communication 618." The pattern (2), i.e., the print setting feasible solely to the second channel may include setting for the print setting item "horizontal flip." The pattern (3), i.e., the print settings feasible to both the first channel and the second channel may include setting for the print setting item "number of copies" 611, the options "auto-cut" and "chain-printing" for the print setting item "cutting option" 613, the default setting for the print setting item "print quality" 614, the default setting for the print setting item "print start" 615, and the default setting for the print setting item "halftone" 616.

At the moment when the information processing apparatus 1 displays the print setting screen 61 (see FIG. 5), the processing channel is not yet appointed. The information processing apparatus 1 may accept the user's operation through the print setting screen 61 and, based on the operation, determine the processing channel to use.

The options and the print settings included in the pattern (1) cited above are feasible solely to the first channel. In the following paragraphs, an operation to validate one of the options or the print settings in the pattern (1) may be referred to as a first operation. The first operation includes an operation to alter a default setting for one of the print setting items to one of the options included in the pattern (1) and an operation to validate one of the options for one of the print setting items in the pattern (1).

The print setting included in the pattern (2) cited above is feasible solely to the second channel In the following paragraphs, an operation to validate an option or a print setting included in the pattern (2) may be referred to as a second operation. The options and the print settings included in the pattern (3) cited above are feasible to both the first channel and the second channel.

The information processing apparatus 2 may determine the first channel to be the processing channel when the first operation to validate at least one of the options or the print settings is entered through the print setting screen 61. The information processing apparatus 2 may determine the second channel to be the processing channel when the second operation is entered through the print setting screen 61. After the first channel or the second channel is appointed as the processing channel, the information processing apparatus 2 may accept an operation to the print start button 63 and process image data for an image to be printed through the appointed processing channel.

When neither the first operation nor the second operation is entered through the print setting screen 61, the information processing apparatus 2 may accept any other operation through the print setting screen 61. On the other hand, when one of the first operation and the second operation is entered through the print setting screen 61, entry of the other of the first operation and the second operation is limited. Limiting an operation may include, for example, not responding to the operation at all, and responding the operation but cancelling the response later. In order to limit the operation by not responding to the operation at all, for example, the information processing apparatus 2 may not display the print setting item or the option that limits the user's operation or may display the limiting setting item in the gray-out form.

For example, when the first operation is entered, the information processing apparatus 2 may limit entry of the second operation. For another example, when the second operation is entered, the information processing apparatus 2 may limit entry of the first operation. In other words, the information processing apparatus 2 may not accept entry of the first operation and the second operation at the same time.

The information processing apparatus 2 may accept entry of an operation to select an option for one of the print settings included in the pattern (3) rather than the first or second operation, and in such a case, the information processing apparatus 2 may neither newly appoint nor alter the processing channel. There may be a case, where once the processing channel is appointed based on the first or second operation entered previously, thereafter, an operation to select an option for the print setting items included in the pattern (3) may be entered. In such a case, the previously entered first or second operation, along with the appointment of the processing channel, may be canceled.

Next, in the following paragraphs, with reference to FIG. 6, described below will be flows of steps in an edit-print setting process to be conducted by the information processing apparatus 2 in order to implement the printing actions in the printing system 100 described earlier. The edit-print setting process may be conducted by the CPU 21 in the information processing apparatus 2 in response to activation of the image-editor application 41. The edit-print setting process may be conducted as a part of actions by the CPU 21 in accordance with the image-editor application 41.

As the edit-print setting process starts, in S101, the CPU 21 controls the operation/display interface 26 to display the editor screen 51 as shown in FIG. 4. In S101, if image data to be edited is designated, the CPU 21 may display the print image 51 based on the designated image data. In the printer selecting field 53 and the medium selecting field 54, the CPU 21 may display, for example, a default printer and a default medium, respectively.

The CPU 21 may accept entry of operations to the buttons in the editor screen 51. In S102, the CPU 21 determines whether an operation to the print button 56 is entered. If the CPU 21 determines that no operation to the print button 56 is entered (S102: NO), in S103, the CPU 21 determines whether a command to end the image-editor application 41 is entered. If the CPU 21 determines that no command to end the image-editor application 41 is entered (S103: NO), the CPU 21 returns to S102 and accepts entry of other operations until either an operation to the print button 56 or a command to end the image-editor application 41 is entered. The other operations may include, for example, an operation to edit or refresh print image 52.

In S102, when the CPU 21 determines that an operation to the print button 56 is entered (S102: YES), in S105, the CPU 21 obtains applicable print setting items. The applicable print setting items may, for example, depend on the model of the printing apparatus 1 and may be stored by the image-editor application 41. For another example, the information processing apparatus 2 may obtain the applicable setting items through communication with the printing apparatus 1. For example, the information processing apparatus 2 may obtain the applicable setting items and the options therefor from the printing apparatus 1 when the information processing apparatus 1 is connected with the printing apparatus 1 for the first time and store the information in the non-volatile memory 24. For another example, the print settings feasible to the second channel may be obtained from the OS 44 within the information processing apparatus 2.

In S106, the CPU 21 controls the operation/display interface 26 to display the print setting screen 61. For example, the print setting screen 61 containing all of the obtained setting items, as shown in FIG. 5, may be displayed. The print setting screen 61 is a single screen, in which the options that are feasible to both the first channel and the second channel are initially selected as default settings. Thus, while all of the applicable setting items are displayed in a single screen, the user may view the applicable setting items and the options therefor at a glance, more easily compared to the applicable setting items that may be displayed in separate screens.

In S107, the CPU 21 appoints a default channel to be the processing channel For example, the default channel may be the second channel Through the second channel, the process may be simplified, and a volume of the image data to be transmitted to the printing apparatus 1 may be downsized. Meanwhile, the default channel may be the first channel. For another example, a processing channel that was used in a previous imaging process in the image-editor application 41 may be stored, and the previously used processing channel may be appointed as the default channel for the current imaging process.

In S111, the CPU 21 determines whether an operation to the print start button 63 is entered through the print setting screen 61. If the CPU 21 determines that an operation to the print start button 63 is entered (S111: YES), in S112, the CPU 21 processes the image data through the processing channel appointed at the moment when the operation to the print start button 63 is entered and outputs data for controlling the printing apparatus 1 to print the image to the printing apparatus 1.

In S111, if the CPU 21 determines that no operation to the print start button 63 is entered (S111: NO), in S113, the CPU 21 determines whether an operation to the cancel button 62 is entered. If the CPU 21 determines that an operation to the cancel button 62 is entered (S113: YES), or following S112, in S114, the CPU 21 closes the print setting screen 61 and returns to S102.

In S113, on the other hand, if no operation to the cancel button 63 is entered (S113: NO), in S116, the CPU 21 determines whether an operation to one of the options for one of the print setting items in the print setting screen 61 is entered. If the CPU 21 determines that an operation is entered (S116: YES), in S117, the CPU 21 conducts a setting alteration process.

Figure 7:
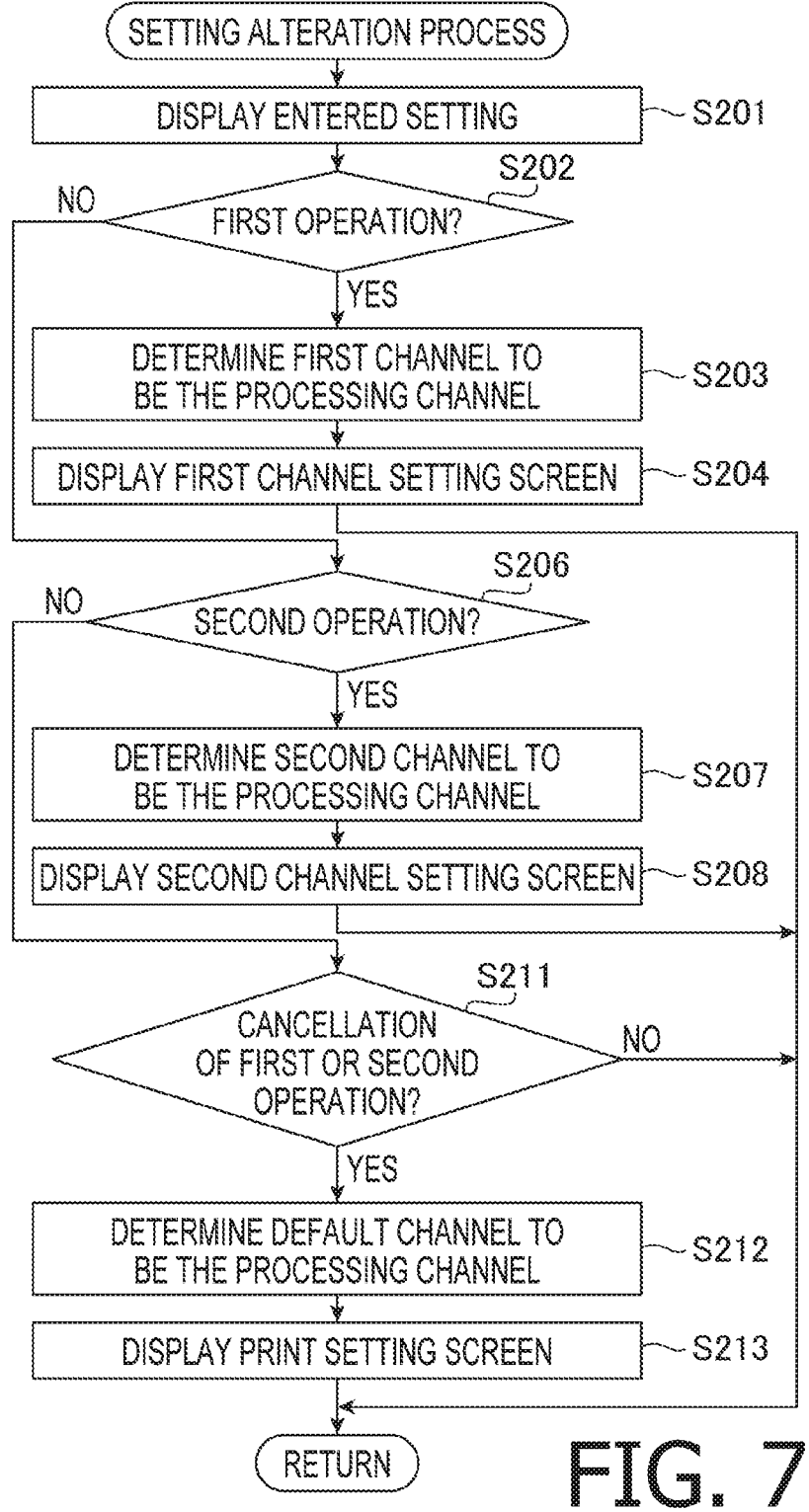
FIG. 7 is a flowchart to illustrate flows of steps in a setting alteration process in the information processing apparatus according to the first embodiment of the present disclosure.

Flows of steps in the setting alteration process will be described below with reference to a flowchart in FIG. 7. The setting alteration process may be conducted as a part of actions by the CPU 21 in accordance with the image-editor application 41. In S201, the CPU 21 displays the print setting screen 61, which reflects the option of the print setting determined to be entered in S116.

In S202, the CPU 21 determines whether the operation determined to be entered in S116 is the first operation. If the CPU 21 determines that the operation is the first operation (S202: YES), in S203, the CPU 21 determines the first channel to be the processing channel In S204, the CPU 21 controls the operation/display interface 26 to display a first channel setting screen 71, for example, as shown in FIG. 8, in place of the print setting screen 61. Thereafter, the CPU 21 exits the setting alteration process and returns to the edit-print setting process in FIG. 6.

The first channel setting screen 71 is a screen, through which the print settings items that are feasible to the second channel alone are displayed in an inoperable form. The information processing apparatus 2 may display the print setting items that are feasible to the second channel alone, e.g., the horizontal flip 619, in, for example, the gray-out format as shown in FIG. 8 so that an operation to the print setting item "horizontal flip" 619 may be refused. For another example, the print setting item that is feasible to the second channel alone may not be displayed at all. While the first channel is determined to be the processing channel based on the entry of the first operation, the print setting item that is feasible to the second channel alone is prevented from being altered by the user. Meanwhile, the print setting items that are feasible to the first channel alone and the print setting items that are feasible to both the first and second channels are displayed to accept the user's operations.

In S202, on the other hand, if the CPU 21 determines that the operation determined to be entered in S116 is not the first operation (S202: NO), in S206, the CPU 21 determines whether the operation determined to be entered in S116 is the second operation. If the CPU 21 determines that the operation is the second operation (S206: YES), in other words, if the first operation is absent in S207, the CPU 21 determines the second channel to be the processing channel Thus, in the flow from S201 to S206, if the first operation is absent, but the entered operation is determined to be the second operation, the CPU 21 appoints the second channel as the processing channel.

In S208, the CPU 21 controls the operation/display interface 26 to display a second channel setting screen 72, for example, as shown in FIG. 9, in place of the print setting screen 61. Thereafter, the CPU 21 exits the setting alteration process.

The second channel setting screen 72 is a screen, in which the print setting items that are feasible to the first channel alone are displayed in an inoperable form. The information processing apparatus 2 may display the print setting items that are feasible to the first channel alone in, for example, the gray-out format as shown in FIG. 8 so that operations to the print setting items feasible to the first channel alone may be refused. Meanwhile, the print setting items that are feasible to the second channel alone and the print setting items that are feasible to both the first and second channels are displayed in the operable form to accept the user's operations.

In S206, on the other hand, if the CPU 21 determines that the operation determined to be entered in S116 is not the second operation (S206: NO), in S211, the CPU 21 determines whether the operation determined to be entered in S116 is an operation to cancel the first operation or the second operation entered earlier. If the CPU 21 determines that the operation is a cancelling operation (S211: YES), in S212, the CPU 21 determines the default channel to be the processing channel The canceling operation to cancel the first operation or the second operation may be, for example, an operation to restore a setting, which has been entered earlier and is feasible to the first channel or the second channel alone, to a default setting. The default channel is the same channel as the processing channel determined in S107 in the edit-print setting process (see FIG. 6).

In S213, the CPU 21 closes the screen having been displayed, i.e., either the first channel setting screen 71 or the second channel setting screen 72, and displays the print setting screen 61. Thereafter, the CPU 21 exits the setting alteration process. In other words, the information processing apparatus 2 is enabled to accept the user's operations to any of the print setting items once again similarly to the state where the CPU 21 initially displayed the print setting screen 61 in S106.

In S211, on the other hand, if the CPU 21 determines that the operation is not a cancelling operation (S211: NO), the CPU 21 exits the setting alteration process. For example, when an operation to an option that is feasible to both the first channel and the second channel is entered, the CPU 21 may not alter the processing channel or the display screen. In S211, the CPU 21 may determine that the operation is a canceling operation when the first operation and/or the second operation having been entered since the beginning of the setting alteration process are all canceled. On the other hand, the CPU 21 may determine that the operation is not a cancelling operation if some of a plurality of first and/or second operations having been entered remain unchanged.

Figure 6:
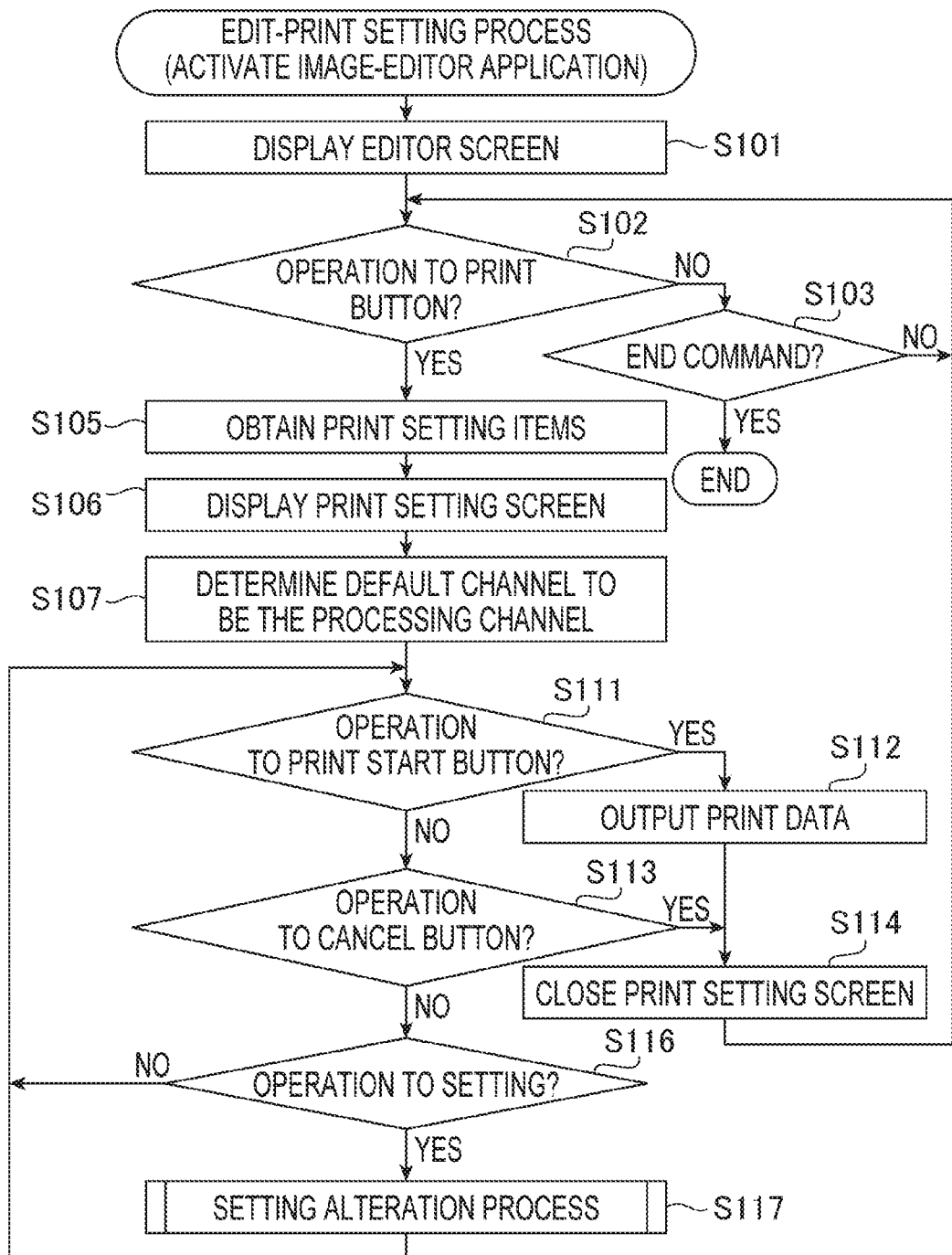
FIG. 6 is a flowchart to illustrate flows of steps in an edit-print setting process in the information processing apparatus according to the first embodiment of the present disclosure.

The flow returns to the edit-print setting operation shown in FIG. 6. Following the setting alteration process in S117, or following the negative determination in S116 (S116: NO), the CPU 21 returns to S111 and waits until one of an operation to the print start button 63 (S111: YES), an operation to the cancel button 62 (S113: YES), and an operation to one of the options for one of the print setting items in the print setting screen 61 (S116: YES) is entered.

Meanwhile, in S103, if the CPU 21 determines that a command to end the image-editor application 41 is entered (S103: YES), the CPU 21 ends the image-editor application 41.

Thus, according to the printing system 100 in the first embodiment, the print setting screen 61 may be displayed, and when the first operation is entered through the print setting screen 61, the first channel may be appointed as the processing channel. The print setting screen 61 is a common screen for the first channel and the second channel and may display the options that are all feasible to the printing apparatus 1. Therefore, the user may select options among all of the applicable options. While the user is not required to designate the processing channel, the information processing apparatus 2 may appoint the processing channel based on the user's selected options. For example, when the first operation is entered by the user, the information processing apparatus 2 may automatically determine the first channel to be the processing channel. Therefore, the processing channel may be appointed without requiring the user to select between the first channel and the second channel so that choosing the options for the print settings may be less confusing to the user.

Next, in the following paragraphs, with reference to FIGS. 10-11, described below will be a second embodiment of the printing system according to the present disclosure. In the following description, items, structures, steps in the flowcharts which are substantially the same as or similar to those described in the first embodiment may be denoted by the same reference signs, and description of those may be omitted.

The information processing apparatus 2 in the second embodiment may conduct the edit-print setting process and the setting alteration process similarly to those described in the first embodiment. In the second embodiment, however, contents of the screens to be displayed may differ from those displayed in the first embodiment. In particular, the information processing apparatus 2 in the second embodiment may display a print setting screen 81 as shown in FIG. 10 in place of the print setting screen 61 in S106.

Figure 10:
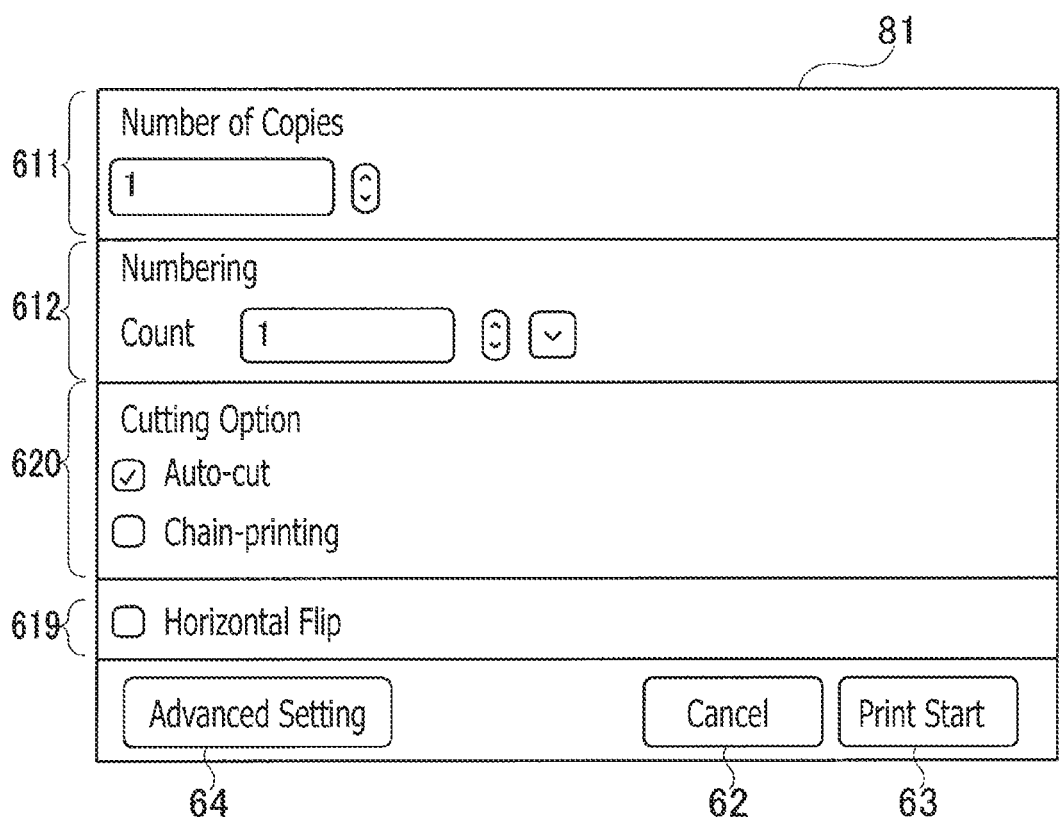
FIG. 10 is an illustrative view of a print setting screen to be displayed in the information processing apparatus according to the first embodiment of the present disclosure.
Figure 12:
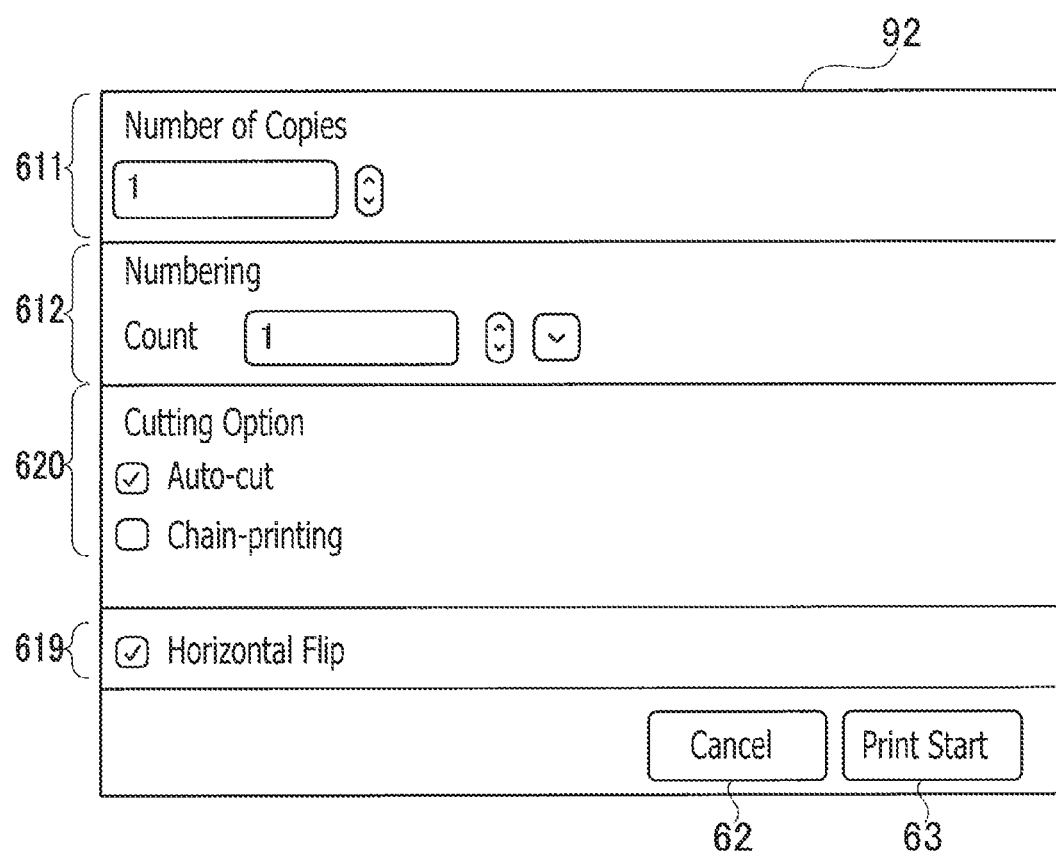
FIG. 12 is an illustrative view of a second channel setting screen to be displayed in the information processing apparatus according to a second embodiment of the present disclosure.

The print setting screen 81 as shown in FIG. 10 contains the option in the pattern (2) for the print setting that is feasible solely to the second channel and the options in the pattern (3) for the print settings are feasible to both the first channel and the second channel. Meanwhile, the print setting screen 81 does not contain the options in the pattern (1) for the print settings that are feasible solely to the first channel. In particular, the print setting screen 81 contains the print setting items "number of copies" 611, "numbering" 612, and "cutting option" 620, which belong to the pattern (3), and the print setting item "horizontal flip" 619, which belong to the pattern (2).

The print setting items "number of copies" 611, "numbering" 612, and "horizontal flip" 619 may contain the same options as those to be displayed in the print setting screen 61 (see FIG. 5) in the first embodiment. Meanwhile, the cutting option 620 contains the options "auto-cut" and "chain-printing," which are feasible to both the first channel and the second channel among the options in the cutting option 613 in the first embodiment. The print setting screen 81 further includes the cancel button 62 and the print start button 63, which are similar to those to be displayed in the print setting screen 61 in the first embodiment. Moreover, the print setting screen 81 includes an advanced setting button 64.

The print setting screen 81 does not contain the print setting item that is feasible to the first channel alone. Meanwhile, when an operation to the advanced setting button 64 is entered, the information processing apparatus 2 determines that the first operation is entered. In other words, an operation to the advanced setting button 64 is equated with the first operation. Therefore, when the operation to the advanced setting button 64 is entered through the print setting screen 81, the CPU 21 may make an affirmative determination in S116 (S116: YES) in the edit-print setting process and start the setting alteration process. Further, the CPU 21 may make an affirmative determination in S202 (S202: YES) in the edit-print setting process. Thereafter, in S204, the CPU 21 may display a first channel setting screen 91 as shown in FIG. 11 in place of the first channel setting screen 71 (see FIG. 8).

The first channel setting screen 91 is a screen, containing the print setting items and the options therefor, which are feasible to the first channel alone, in the pattern (1). In particular, the first channel setting screen 91 may contain the print setting items "print quality" 614, "print start" 615, "halftone" 616, "brightness/contrast" 617, "bidirectional communication" 618, "cutting option" 621, and the options therefor. The print setting items "print quality" 614, "print start" 615, "halftone" 616, "brightness/contrast" 617, and "bidirectional communication" 618 may be similar to those to be displayed in the print setting screen 61 in the first embodiment. The print setting item "cutting option" 621 may contain the options "half-cut" and "special tape," which are feasible to the first channel alone, among the options contained in the cutting option 613 displayed in the print setting screen 61 in the first embodiment. The first channel setting screen 91 further contains the OK button 65.

An operation entered through the first channel setting screen 91 is the first operation alone. When the first channel setting screen 91 is being displayed, it is more likely that the first operation is entered. Therefore, in the second embodiment, at the moment when the first channel setting screen 91 is displayed, the first channel is determined to be the processing channel.

Meanwhile, the CPU 21 determines that the first operation is canceled when no operation is entered through the first channel setting screen 91 or when the options selected by the operations entered through the first channel setting screen 91 are all restored to the original options. Therefore, in S211 in the setting alteration process, the CPU 21 makes an affirmative determination (S211: YES). Thereafter, the CPU 21 determines the default channel to be the processing channel and close the first channel setting screen 91. The CPU 21 thereafter restores the print setting screen 81 and may accept entry of an operation to the print setting screen 81.

In the second embodiment, an operation to select the option "horizontal flip" 619 through the print setting screen 81 is considered to be the second operation. In other words, when an operation to select the option "horizontal flip" 619 is entered through the print setting screen 81, the CPU 21 makes an affirmative determination in S116 (S116: YES) in the edit-print setting process and starts the setting alteration process. In S206 in the setting alteration process, the CPU 21 makes an affirmative determination (S206: YES). Thereafter, in S208, the CPU 21 displays the second channel setting screen 92 in place of the second channel setting screen 72 displayed in the first embodiment.

The second channel setting screen 92 is a screen, which may be generally similar to the print setting screen 81 but does not contain the advanced setting button 64. While the advanced setting button 64 is not displayed, the information processing apparatus 2 may prevent the first operation from being entered through the second channel setting screen 92. If an operation to the setting "horizontal flip" 619 is entered once again, in other words, the setting for "horizontal flip" 619 is removed, the CPU 21 may determine that the second operation is canceled. Therefore, in S211 in the setting alteration process, the CPU 21 makes an affirmative determination (S211: YES) and restores the print setting screen 81 to accept entry of an operation to the print setting screen 81.

The information processing apparatus 2 accepting entry of an operation to the print button 56 through the editor screen 51 displays the print setting screen 81, in which a number of the print setting items is smaller than the number of the print setting items being displayed in the print setting screen 61 in the first embodiment. Through the print setting screen 81, the information processing apparatus 2 may accept entry of an operation, i.e., the first operation, to the advanced setting button 64, and in response to the first operation, the information processing apparatus 2 may display the first channel setting screen 91, in which the number of the print setting items is larger than the print setting screen 81. Thus, while the applicable setting items are displayed in separate screens, a number of the print setting items to be displayed in each screen may be reduced, and appearance of each screen may be simplified to be looked through by the user more easily. When an operation to the advanced setting button 64 is entered, it may be likely that an option for the print setting item is entered through the first channel setting screen 91. In this regard, the information processing apparatus 2 may appoint the first channel as the processing channel.

In the second embodiment, the print setting screen 81 contains the print setting item in the pattern (2) that is feasible to the second channel alone, while the print setting items in the pattern (1) that are feasible to the first channel alone are not contained. However, this arrangement may be inverted. In other words, the print setting screen 81 may contain the print setting items in the pattern (1) that are feasible to the first channel alone, while the print setting item in the pattern (2) may be excluded from the print setting screen 81. In this arrangement, an operation to the advanced setting button 64 would correspond to the second operation. The first channel setting screen 91 is equal to the print setting screen 81 without the advanced setting button 64, and the second channel setting screen 92 is a screen that contains the print setting item in the pattern (2) but does not contain the print setting items in the pattern (1). For another example, the print setting screen 81 may contain the print setting item(s) in one of the pattern (1) and the pattern (2), of which number of the print setting item(s) is smaller, along with the print setting items in the pattern (3).

Thus, according to the printing system 100 in the second embodiment, the print setting screen 81 may be displayed, and when an operation to the advanced setting button 64 is entered through the print setting screen 81, the first channel setting screen 91 may be displayed, and the first channel may be determined to be the processing channel Thereby, in response to entry of the first operation, the information processing apparatus 2 may automatically appoint the first channel as the processing channel Therefore, the processing channel may be appointed without requiring the user to select between the first channel and the second channel so that entering the options for the print settings may be less confusing to the user.

Although examples of carrying out the invention has been described, those skilled in the art will appreciate that there are numerous variations and permutations of the program to be run in the information processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the printing apparatus 1 may not necessarily be equipped with the operation panel 13. For another example, the memory medium in the information processing apparatus 2 may not necessarily be limited to the non-volatile memory 24 but may be any type of mass storage memory device.

For another example, the communication method between the printing apparatus 1 and the information processing apparatus 2 may not necessarily be limited to the wireless communication in compliance with the Wi-Fi standard but may be, for example, wired communication through a LAN cable, a USB cable, or wireless communication in compliance with Bluetooth (registered trademark). Further, the printing apparatus 1 and the information processing apparatus 2 may be adapted to a plurality of communication methods.

For another example, the image file for the image to be printed may not necessarily be limited to the label image file for printing a label on a tape. For example, the image file may be a compressed file including a PDF file, a JPEG file, etc., or may be a bitmap file. When the image file other than the label image file is used, an application program and a print-controlling program that may handle the image data equivalently to the image-editor application 41 and the specialized print-controlling program 43 may be adopted.

For another example, the second channel may not necessarily require rasterization in the printing apparatus 1; in other words, rasterization may be conducted in the information processing apparatus 2, as long as the second channel provides a processing channel different from the first channel. For example, if the basic print-controlling program 45 has the rasterizing function, the basic print-controlling program 45 may rasterize the image data by its own rasterizing function. In this configuration, the first channel and the second channel still differ in algorisms for the rasterization. In this configuration, further, while the first channel is a channel, which does not use the print-controlling function provided by the OS 44, and the second channel is a channel, which uses the print-controlling function provided by the OS 44.

For another example, the processing channels in the printing system 100 may not necessarily be limited to the first channel and the second channel, but the printing system 100 may have three or more channels. For example, the printing system 100 may have a channel, in which an image may be printed by a driver specialized to the device, and, a channel, in which an image may be printed by CUPS being a printer driver for UNIX (registered trademark), macOS (registered trademark), and Linux (registered trademark). The device-specific driver and CUPS are programs embedded in the OS 44 (see FIG. 2) in the information processing apparatus 2 to rasterize image data. With these additional processing channels, if errors occur in both the first channel and the second channel, the image printing may be retried through these additional processing channels.

For another example, the print setting items and the options therefor to be displayed in the setting screens may not necessarily be limited to those described above or illustrated in the accompanying drawings, but a smaller or larger number of the print setting items and/or options may be displayed. The setting screen may at least contain a field to accept entry of the first operation. For another example, no setting item or option that is feasible to the second channel alone and infeasible to the first channel may necessarily be provided. If no setting item or option that is feasible to the second channel alone and infeasible to the first channel is provided, the second channel setting screen 72, 92 may be omitted.

For another example, when an operation to the print start button 63 is entered while no processing channel is yet determined, the default channel may not necessarily be automatically appointed as the processing channel, but the information processing apparatus 2 may query the user about his/her preference for the processing channel and appoint the processing channel based on the user's responsive operation.

For another example, when one of the first and second channels is appointed as the processing channel, the print setting items and the options therefor that are feasible to the other channel alone may not necessarily be displayed in the gray-out form. For example, one of the channels appointed by a setting selected later may be displayed as the valid processing channel, and appointment of the other of the channels appointed by a setting selected earlier may be cancelled or deleted from the screen. For another example, the information processing apparatus 2 may query the user about his/her preference for the processing channel. Meanwhile, if the print setting items and the options therefor that are feasible to the other channel alone are displayed in the gray-out format, the user may recognize existence of other options that are applicable to the image printing more clearly and may select the print setting items and the options more effectively.

For another example, the printing system 100 may not necessarily be feasible to both the first channel and the second channel but may be feasible to one of the first channel and the second channel alone. For example, the printing system 100 may include a first printer, which is feasible to the first channel but is infeasible to the second channel, a second printer, which is infeasible to the first channel but is feasible to the second channel, and a third printer, which is feasible to both the first channel and the second channel. In this configuration, the information processing apparatus 2 may display the same print setting screen 61 or 81 regardless of the channel(s) feasible to the designated printing apparatus 1. Thereby, the information processing apparatus 2 may accept entries of the print settings provided by the image-editor application 41 without causing the user to be aware of the processing channel. Alternately, a setting screen, which does not contain the print setting items or the options that are infeasible to the channel in the designated printing apparatus 1, may be displayed.

For another example, the image-editor application 41 may not necessarily be equipped with the function to edit images. An image may be edited by a basic application program, while the image-editor application 41 may be equipped with a function to print an image in a file created by the basic application program.

For another example, the steps or the processes in the printing process described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A non-transitory computer readable storage medium storing computer readable instructions that are executable by a computer in an information processing apparatus, the information processing apparatus comprising a display interface, an operation interface, and a communication interface through which the information processing apparatus is connected with a printer, the information processing apparatus comprising a first channel and a second channel each configured to cause the printer to print an image through the communication interface based on image data, the computer readable instructions, when executed by the computer, causing the information processing apparatus to:

control the display interface to display a setting screen, the setting screen being configured to accept entry of print settings applicable to the printer, the print settings including a first setting and a second setting, the first setting being feasible to the first channel but infeasible to the second channel, the second setting being feasible at least to the second channel, the setting screen displaying the first setting and the second setting in different forms; and accept an operation to the setting screen to enter one of the first setting and the second setting through the operation interface.

2. The non-transitory computer readable storage medium according to claim 1, wherein the second setting includes a third setting, the third setting being feasible to the second channel but infeasible to the first channel, wherein, in response to an operation to the setting screen to enter the third setting through the operation interface, the computer readable instructions cause the information processing apparatus to control the display interface to display the setting screen containing at least the third setting; and wherein the first setting is, when contained in the setting screen being displayed in response to the operation to enter the third setting, displayed in an inoperable form.

3. The non-transitory computer readable storage medium according to claim 1, wherein the second setting includes a third setting, the third setting being feasible to the second channel but infeasible to the first channel, wherein, in response to an operation to the setting screen to enter the first setting through the operation interface, the computer readable instructions cause the information processing apparatus to control the display interface to display the setting screen containing at least the first setting, and wherein the third setting is, when contained in the setting screen being displayed in response to the operation to enter the first setting, displayed in an inoperable form.

4. The non-transitory computer readable storage medium according to claim 1, wherein, in response to an operation to the setting screen to enter the first setting through the operation interface, the computer readable instructions cause the information processing apparatus to determine the first channel to be a processing channel to be used to cause the printer to print the image.

5. The non-transitory computer readable storage medium according to claim 4,
wherein, in response to entry of a command to the information processing apparatus to start printing the image through the operation interface, the computer readable instructions cause the information processing apparatus to output data for commanding the printer to print the image to the printer, the output data being processed through one of the first channel and the second channel determined to be the processing channel.

6. The non-transitory computer readable storage medium according to claim 1,
wherein the setting screen is a single screen, in which all of the print settings that are feasible to at least one of the first channel and the second channel are displayed.

7. The non-transitory computer readable storage medium according to claim 1,
wherein the setting screen includes a first screen and a second screen, the second screen being configured to be displayed in response to an operation to the first screen,
wherein the first screen contains a print setting feasible to both the first channel and the second channel but does not contain the first setting among the print settings applicable to the printer, and
wherein the second screen contains the first setting among the print settings applicable to the printer.

8. The non-transitory computer readable storage medium according to claim 1,
wherein the second setting includes a third setting, the third setting being feasible to the second channel but infeasible to the first channel;
wherein, in response to an operation to the setting screen to enter the first setting through the operation interface, the computer readable instructions cause the information processing apparatus to limit entry of the third setting through the setting screen.

9. The non-transitory computer readable storage medium according to claim 1,
wherein, in response to a print commanding operation through the operation interface, the computer readable instructions cause the information processing apparatus to control the display interface to display the setting screen.

10. The non-transitory computer readable storage medium according to claim 1,
wherein one of the first channel and the second channel is a channel to process the image data for the image to be printed by the printer through a first rasterization process, and
wherein the other of the first channel and the second channel is a channel to process the image data for the image to be printed by the printer through a second rasterization process, the second rasterization process being different from the first rasterization process.

11. The non-transitory computer readable storage medium according to claim 1,
wherein one of the first channel and the second channel is a channel, through which the computer readable instructions cause the information processing apparatus to rasterize the image data, and
wherein the other of the first channel and the second channel is a channel, through which the computer readable instructions cause the printer to rasterize the image data.

12. The non-transitory computer readable storage medium according to claim 1,
wherein an operating system in the information processing apparatus includes a print controlling function,
wherein one of the first channel and the second channel is a channel to cause the printer to print the image without using the print controlling function, and
wherein the other of the first channel and the second channel is a channel to cause the printer to print the image by use of the print controlling function.

13. The non-transitory computer readable storage medium according to claim 1,
wherein, based on absence of an operation to the setting screen to enter the first setting through the operation interface, the computer readable instructions cause the information processing apparatus to determine the second channel to be a processing channel prior to commanding the printer to print the image.

14. The non-transitory computer readable storage medium according to claim 1,
wherein the printer includes:
a first-type printer being feasible to print the image based on first data for commanding the printer to print the image, the first data being processed through the first channel, the first-type printer being infeasible to print the image based on second data for commanding the printer to print the image, the second data being processed through the second channel;
a second-type printer being infeasible to print the image based on the first data, the second-type printer being feasible to print the image based on the second data; and
a third-type printer being feasible to print the image based on the first data and on the second data, and
wherein the computer readable instructions cause the information processing apparatus to display the same setting screen to accept entry of the print settings applicable to the printer regardless of a type of the printer being connected with the information processing apparatus among the first-type printer, the second-type printer, and the third-type printer.

15. An information processing apparatus, comprising:
a display interface;
an operation interface;
a communication interface, through which the information processing apparatus is connected with a printer;
a plurality of processing channels including a first channel and a second channel, each of which is configured to cause the printer to print an image through the communication interface based on image data; and
a controller configured to:
control the display interface to display a setting screen, the setting screen being configured to accept entry of print settings applicable to the printer, the print settings including a first setting and a second setting, the first setting being feasible to the first channel but infeasible to the second channel, the second setting being feasible at least to the second channel, the setting screen displaying the first setting and the second setting in different forms; and
accept an operation to the setting screen to enter one of the first setting and the second setting through the operation interface.

* * * * *